(12) United States Patent
Ullah et al.

(10) Patent No.: US 10,138,430 B2
(45) Date of Patent: Nov. 27, 2018

(54) CONVERSION OF LIPIDS INTO OLEFINS

(71) Applicant: THE GOVERNORS OF THE UNIVERSITY OF ALBERTA, Edmonton (CA)

(72) Inventors: Aman Ullah, Edmonton (CA); Muhammad Arshad, Edmonton (CA)

(*) Notice: Subject to any disclaimer, the term of this patent is extended or adjusted under 35 U.S.C. 154(b) by 0 days.

(21) Appl. No.: 15/257,279

(22) Filed: Sep. 6, 2016

(65) Prior Publication Data

US 2017/0066973 A1    Mar. 9, 2017

Related U.S. Application Data

(60) Provisional application No. 62/213,879, filed on Sep. 3, 2015.

(51) Int. Cl.
    *C07C 1/20* (2006.01)
    *C10G 3/00* (2006.01)

(52) U.S. Cl.
    CPC ....... *C10G 3/44* (2013.01); *C10G 2300/1088* (2013.01); *C10G 2400/22* (2013.01); *Y02P 30/20* (2015.11)

(58) Field of Classification Search
    CPC .... C07C 1/00; C07C 1/02; C07C 1/04; C07C 1/20; C07C 1/213; C07C 1/22; C07C 1/24; C10G 2300/1088; C10G 2400/22; C10G 3/44
    See application file for complete search history.

(56) References Cited

U.S. PATENT DOCUMENTS 9,604,903 B2 * 3/2017 Wels ................. C07C 67/475

OTHER PUBLICATIONS

Bidange et al. Ruthenium catalyzed ethenolysis of renewable oleonitrile. Eur. J. Lipid Sci. Technol. 2014, 116, 1583-1589.*
Mecking, S., Nature or Petrochemistry?—Biologically Degradable Materials. Angew. Chem. Int. Ed. 2004, 43, 1078-1085.
Dodds, D. R.; Gross, R. A., Chemicals from Biomass. Science 2007, 318, 1250-1251.
Chikkali, S.; Mecking, S., Refining of Plant Oils to Chemicals by Olefin Metathesis. Angew. Chem. Int. Ed. 2012, 51, 5802-5808.
Anastas, P. T.; Kirchhoff, M. M., Origins, Current Status, and Future Challenges of Green Chemistry. Acc. Chem. Res. 2002, 35, 686-694.
Corma, A.; Iborra, S.; Velty, A., Chemical Routes for the Transformation of Biomass into Chemicals. Chem. Rev. 2007, 107, 2411-2502.
Vennestrom, P. N. R; Osmundsen, C. M.; Christensen, C. H.; Taarning, E., Beyond Petrochemicals: The Renewable Chemicals Industry. Angew. Chem. Int. Ed. 2011, 50, 10502-10509.
Biorefineries—industrial processes and products : status quo and future directions. Kamm, B.; Gruber, P. R.; Kamm, M., Eds. Wiley-VCH: Weinheim ;, 2006.
Öztürk, B. Ö.; Topoğlu, B.; Karabulut Şehitoğlu, S., Metathesis reactions of rapeseed oil-derived fatty acid methyl esters induced by monometallic and homobimetallic ruthenium complexes. Eur. J. Lipid Sci. Tech. 2015, 117, 200-208.
Biermann, U.; Bomscheuer, U.; Meier, M. A. R.; Metzger, J. O.; Schafer, H. J., Oils and Fats as Renewable Raw Materials in Chemistry. Angew. Chem. Int. Ed. 2011, 50, 3854-3871.
Meier, M. A. R.; Metzger, J. O.; Schubert, U. S., Plant oil renewable resources as green alternatives in polymer science. Chem. Soc. Rev. 2007, 36, 1788-1802.
Carlsson, A. S.; Yilmaz, J. L; Green, A. G.; Stymne, S.; Hofvander, P., Replacing fossil oil with fresh oil—with what and for what? Eur. J. Lipid Sci. Tech. 2011, 113, 812-831.
Biermann, U.; Friedt, W.; Lang, S.; Lühs, W.; Machmüller, G.; Metzger, J. O.; Rüsch gen. Klaas, M.; Schäfer, H. J.; Schneider, M. P., New Syntheses with Oils and Fats as Renewable Raw Materials for the Chemical Industry. Angew. Chem. Int. Ed. 2000, 39, 2206-2224.
Schieb, P. A., Biorefinery 2030 : future prospects for the bioeconomy. Lescieux-Katir, H.; Thenot, M.; Clement-Larosiere, B., Eds. Springer Berlin Heidelberg2015; p. 160.
Takahira, Y.; Morizawa, Y., Ruthenium-Catalyzed Olefin Cross-Metathesis with Tetrafluoroethylene and Analogous Fluoroolefins. J. Am. Chem. Soc. 2015, 137, 7031-7034.
Grubbs, R. H.; Wenzel, A. G.; O'Leary, D. J.; Khosravi, E., Handbook of metathesis. Second edition. ed.; Grubbs, R. H.; Wenzel, A. G.; O'Leary, D. J.; Khosravi, E., Eds. Wiley-VCH: Weinheim2015. doi:10.1002/9783527674107.
Grubbs, R. H., Olefin-Metathesis Catalysts for the Preparation of Molecules and Materials (Nobel Lecture). Angew. Chem. Int. Ed. 2006, 45, 3760-3765.
Chauvin, Y., Olefin Metathesis: The Early Days (Nobel Lecture). Angew. Chem. Int. Ed. 2006, 45, 3740-3747.
Schrock, R. R., Multiple Metal-Carbon Bonds for Catalytic Metathesis Reactions (Nobel Lecture). Angew. Chem. Int. Ed. 2006, 45, 3748-3759.
Basra, S.; Blechert, S., Chapter 12—Ring Rearrangement Metathesis (RRM)—A New Concept in Piperidine and Pyrrolidine Synthesis. In Strategies and Tactics in Organic Synthesis, Michael, H., Ed. Academic Press2004; vol. vol. 4, pp. 315-346.
Hoveyda, A. H.; Zhugralin, A. R., The remarkable metal-catalysed olefin metathesis reaction. Nature 2007, 450, 243-251.
Connon, S. J.; Blechert, S., Recent Developments in Olefin Cross-Metathesis. Angew. Chem. Int. Ed. 2003, 42, 1900-1923.
Calderon, N., Olefin metathesis reaction. Acc. Chem. Res. 1972, 5, 127-132.
Mol, J. C., Application of olefin metathesis in oleochemistry: an example of green chemistry. Green Chem. 2002, 4, 5-13.
Nickel, A.; Pederson, R. L., Commercial Potential of Olefin Metathesis of Renewable Feedstocks. In Olefin Metathesis, John Wiley & Sons, Inc.2014; pp. 335-348.

(Continued)

*Primary Examiner* — Sharon Pregler
(74) *Attorney, Agent, or Firm* — Bennett Jones LLP

(57) ABSTRACT

A method of converting lipids to useful olefins includes reacting a mixture of lipids and a reactant olefin with microwave irradiation in the presence of ruthenium metathesis catalysts. The lipids may be unsaturated triacylglycerols or alkyl esters of fatty acids. The lipids may be sourced from renewable sources such as vegetable oil, waste cooking oil, or waste animal products.

12 Claims, 8 Drawing Sheets

(56) References Cited

OTHER PUBLICATIONS

Burdett, K. A.; Harris, L D.; Margl, P.; Maughon, B. R.; Mokhtar-Zadeh, T.; Saucier, P. C.; Wasserman, E. P., Renewable Monomer Feedstocks via Olefin Metathesis: Fundamental Mechanistic Studies of Methyl Oleate Ethenolysis with the First-Generation Grubbs Catalyst. Organometallics 2004, 23, 2027-2047.

Julis, J.; Bartlett, S. A.; Baader, S.; Beresford, N.; Routledge, E J.; Cazin, C. S. J.; Cole-Hamilton, D. J., Selective ethenolysis and oestrogenicity of compounds from cashew nut shell liquid. Green Chem. 2014, 16, 2846-2856.

Herbert, M. B.; Marx, V. M.; Pederson, R. L.; Grubbs, R. H., Concise Syntheses of Insect Pheromones Using Z-Selective Cross Metathesis. Angew. Chem. Int. Ed. 2013, 52, 310-314.

Marx, V. M.; Sullivan, A. H.; Melaimi, M.; Virgil, S. C.; Keitz, B. K; Weinberger, D. S.; Bertrand, G.; Grubbs, R. H., Cyclic Alkyl Amino Carbene (CAAC) Ruthenium Complexes as Remarkably Active Catalysts for Ethenolysis. Angew. Chem. Int. Ed. 2015, 54, 1919-1923.

Jenkins, R. W.; Sargeant, L. A.; Whiffin, F. M.; Santomauro, F.; Kaloudis, D.; Mozzanega, P.; Bannister, C. D.; Baena, S.; Chuck, C. J., Cross-Metathesis of Microbial Oils for the Production of Advanced Biofuels and Chemicals. ACS Sustain. Chem. Eng. 2015, 3, 1526-1535.

Montero de Espinosa, L.; Meier, M. A. R., Plant oils: The perfect renewable resource for polymer science?! Eur. Polym. J. 2011, 47, 837-852.

Thomas, R. M.; Keitz, B. K.; Champagne, T. M.; Grubbs, R. H., Highly Selective Ruthenium Metathesis Catalysts for Ethenolysis. J. Am. Chem. Soc. 2011, 133, 7490-7496.

Marinescu, S. C.; Schrock, R. R.; Müller, P.; Hoveyda, A. H., Ethenolysis Reactions Catalyzed by Imido Alkylidene Monoaryloxide Monopyrrolide (MAP) Complexes of Molybdenum. J. Am. Chem. Soc. 2009, 131, 10840-10841.

Patel, J.; Elaridi, J.; Jackson, W. R.; Robinson, A. J.; Serelis, A. K.; Such, C., Cross-metathesis of unsaturated natural oils with 2-butene. High conversion and productive catalyst turnovers. Chem. Commun. 2005, 5546-5547.

Van der Klis, F.; Le Nôtre, J.; Blaauw, R.; van Haveren, J.; van Es, D. S., Renewable linear alpha olefins by selective ethenolysis of decarboxylated unsaturated fatty acids. Eur. J. Lipid Sci. Tech. 2012, 114, 911-918.

Nickel, A.; Ung, T.; Mkrtumyan, G.; Uy, J.; Lee, C. W.; Stoianova, D.; Papazian, J.; Wei, W.-H.; Mallari, A.; Schrodi, Y.; Pederson, R. L., A Highly Efficient Olefin Metathesis Process for the Synthesis of Terminal Alkenes from Fatty Acid Esters. Top. Catal. 2012, 55, 518-523.

Zhang, J ; Song, S ; Wang, X.; Jiao, J.; Shi, M., Ruthenium-catalyzed olefin metathesis accelerated by the steric effect of the backbone substituent in cyclic (alkyl)(amino) carbenes. Chem. Commun. 2013, 49, 9491-9493.

Anderson, D. R.; Ung, T.; Mkrtumyan, G.; Bertrand, G.; Grubbs, R. H.; Schrodi, Y., Kinetic Selectivity of Olefin Metathesis Catalysts Bearing Cyclic (Alkyl)(Amino)Carbenes. Organometallics 2008, 27, 563-566.

Schrodi, Y.; Ung, T.; Vargas, A.; Mkrtumyan, G.; Lee, C. W.; Champagne, T. M.; Pederson, R. L; Hong, S. H., Ruthenium Olefin Metathesis Catalysts for the Ethenolysis of Renewable Feedstocks. Clean. 2008, 36, 669-673.

Patel, J.; Mujcinovic, S.; Jackson, W. R.; Robinson, A. J.; Serelis, A. K.; Such, C., High conversion and productive catalyst turnovers in cross-metathesis reactions of natural oils with 2-butene. Green Chem. 2006, 8, 450-454.

Anderson, D. R.; Lavallo, V.; O'Leary, D. J.; Bertrand, G.; Grubbs, R. H., Synthesis and Reactivity of Olefin Metathesis Catalysts Bearing Cyclic (Alkyl)(Amino)Carbenes. Angew. Chem. 2007, 119, 7400-7403.

Kappe, C. O., Controlled Microwave Heating in Modem Organic Synthesis. Angew. Chem. Int. Ed. 2004, 43, 3250-6284.

Gawande, M. B.; Shelke, S. N.; Zboril, R.; Varma, R. S., Microwave-Assisted Chemistry: Synthetic Applications for Rapid Assembly of Nanomaterials and Organics. Acc. Chem. Res. 2014, 47, 1338-1348.

Polshettiwar, V.; Nadagouda, M. N.; Varma, R. S., Microwave-Assisted Chemistry: a Rapid and Sustainable Route to Synthesis of Organics and Nanomaterials. Aust. J. Chem. 2009, 62, 16-26.

Appukkuttan, P.; Dehaen, W.; Van der Eycken, E., Microwave-Enhanced Synthesis of N-Shifted Buflavine Analogues via a Suzuki-Ring-Closing Metathesis Protocol. Org. Lett. 2005, 7, 2723-2726.

Bargiggia, F. C.; Murray, W. V., Cross-Metathesis Assisted by Microwave Irradiation. J. Org. Chem. 2005, 70, 9636-9639.

Kappe, C. O.; Stadler, A.; Dallinger, D., Introduction: Microwave Synthesis in Perspective. In Microwaves in Organic and Medicinal Chemistry, Wiley-VCH Verlag GmbH & Co. KGaA2012; pp. 1-7.

Dudley, G. B.; Richert, R.; Stiegman, A. E., On the existence of and mechanism for microwave-specific reaction rate enhancement. Chem. Sci. 2015, 6, 2144-2152.

Yang, C.; Murray, W. V.; Wilson, L. J., Microwave enabled external carboxymethyl substituents in the ring-closing metathesis. Tetrahedron Lett. 2003, 44, 1783-1786.

Morris, T.; Sandham, D.; Caddick, S., A microwave enhanced cross-metathesis approach to peptidomimetics. Org. Biomol. Chem. 2007, 5, 1025-1027.

Garbacia, S.; Desai, B.; Lavastre, O.; Kappe, C. O., Microwave-Assisted Ring-Closing Metathesis Revisited. On the Question of the Nonthermal Microwave Effect. J Org. Chem. 2003, 68, 9136-9139.

Casey, C. P., 2005 Nobel Prize in Chemistry. Development of the Olefin Metathesis Method in Organic Synthesis. J. Chem. Educ. 2006, 83, 192.

Nguyen, S. T.; Grubbs, R. H.; Ziller, J. W., Syntheses and activities of new single-component, ruthenium-based olefin metathesis catalysts. J. Am. Chem. Soc. 1993, 115, 9858-9859.

Schwab, P.; Grubbs, R. H.; Ziller, J. W., Synthesis and Applications of RuCl2(CHR')(PR3)2: The Influence of the Alkylidene Moiety on Metathesis Activity. J. Am. Chem. Soc. 1996, 118, 100-110.

Trnka, T. M.; Grubbs, R. H., The Development of L2X2RuCHR Olefin Metathesis Catalysts: An Organometallic Success Story. Acc. Chem. Res. 2001, 34, 18-29.

Hong, S. H.; Wenzel, A. G.; Salguero, T. T.; Day, M. W.; Grubbs, R. H., Decomposition of Ruthenium Olefin Metathesis Catalysts. J. Am. Chem. Soc. 2007, 129, 7961-7968.

Ulman, M.; Grubbs, R. H., Ruthenium Carbene-Based Olefin Metathesis Initiators: Catalyst Decomposition and Longevity. J. Org. Chem. 1999, 64, 7202-7207.

Collins, S. K., Solvent and Additive Effects on Olefin Metathesis. In Handbook of Metathesis, Wiley-VCH Verlag GmbH & Co. KGaA2015; pp. 343-377.

Schrodi, Y., Mechanisms of Olefin Metathesis Catalyst Decomposition and Methods of Catalyst Reactivation. In Handbook of Metathesis, Wiley-VCH Verlag GmbH & Co. KGaA2015; pp. 323-342.

Patel, J.; Mujcinovic, S.; Jackson, W. R.; Robinson, A. J.; Serelis, A. K.; Such, C., High conversion and productive catalyst turnovers in cross-metathesis reactions of natural oils with 2-butene. Green Chemistry 2006, 8, 450-454.

Marx, V. M.; Sullivan, A. H.; Melaimi, M.; Virgil, S. C.; Keitz, B. K; Weinberger, D. S.; Bertrand, G.; Grubbs, R. H., Cyclic Alkyl Amino Carbene (CAAC) Ruthenium Complexes as Remarkably Active Catalysts for Ethenolysis. Angewandte Chemie International Edition 2015, 54, 1919-1923.

Forman, G. S.; McConnell, A. E.; Hanton, M. J.; Slawin, A. M. Z.; Tooze, R. P.; van Rensburg, W. J.; Meyer, W. H.; Dwyer, C.; Kirk, M. M.; Serfontein, D. W., A Stable Ruthenium Catalyst for Productive Olefin Metathesis. Drganometallics 2004, 23, 4824-4827.

Huber, G. W.; Iborra, S.; Corma, A., Synthesis of Transportation Fuels from Biomass: Chemistry, Catalysts, and Engineering. Chemical Reviews 2006, 106, 4044-4098.

Marinescu, S. C.; Schrock, R. R.; Muller, P.; Hoveyda, A. H., Ethenolysis Reactions Catalyzed by Imido Alkylidene Vlonoaryloxide Monopyrrolide (MAP) Complexes of Molybdenum. Journal of the American Chemical Society 2009, 131, 10840-10841.

(56) References Cited

OTHER PUBLICATIONS

Schrodi, Y.; Ung, T.; Vargas, A.; Mkrtumyan, G.; Lee, C. W.; Champagne, T. M.; Pederson, R. L; Hong, S. H., Ruthenium Olefin Metathesis Catalysts for the Ethenolysis of Renewable Feedstocks. CLEAN—Soil, Air, Water 2008, 36, 669-673.

Arshad, M.; Saied, S.; Ullah, A., PEG-lipid telechelics incorporating fatty acids from canola oil: synthesis, characterization and solution self-assembly. RSC Advances 2014, 4, 26439-26446.

Ullah, A.; Arshad, M., Remarkably Efficient Microwave-Assisted Cross-Metathesis of Lipids under Solvent-Free Conditions. ChemSusChem 2017, 10, 2167-2174.

* cited by examiner

US 10,138,430 B2

CONVERSION OF LIPIDS INTO OLEFINS

CROSS-REFERENCE TO RELATED APPLICATION

The present application claims the priority benefit of U.S. Provisional Patent Application No. 62/213,879, filed on Sep. 3, 2015, the entire contents of which are incorporated herein by reference, for all purposes.

FIELD OF THE INVENTION

The present invention relates to methods of converting lipids into useful olefins.

BACKGROUND

More than 90% of the raw materials for today's chemical industry are petroleum feedstocks while only one-tenth of the feedstock comes from renewable resources. Considering the increasing importance of sustainability, there is interest on the development of fuels, chemicals and materials from renewable resources. The transformation of plant oils, due to their low cost, biodegradability and large scale availability, has received significant attention. In addition to large scale availability, a wide range of products can be obtained from plant oils which make them cost-effective and environment friendly alternative.

For chemical conversion and formation of new carbon-carbon double bonds, olefin metathesis is considered a versatile synthetic transformation tool and has been used in both pure and applied chemistry. Generally, olefin metathesis can be classified into ring-opening, ring closing and cross-metathesis. Metal-catalyzed olefin cross-metathesis (CM) has become a standard synthetic method with numerous industrial uses, including the well-known Shell Higher Olefin Process (SHOP). Olefin cross-metathesis is a catalytic reaction between two alkene molecules that results in redistribution of alkylidene groups. The cross-metathesis of an olefinic compound with ethylene is called ethenolysis, and a cross-metathesis with an olefin other than ethylene is called alkenolysis. Various efforts have been made on the conversion of plant oil derived fatty acids into products using ethylene metathesis (ethenolysis) chemistry. The production of olefins through ethenolysis may produce high value linear α-olefins which are direct antecedent to various applications including monomers for polymer synthesis, cosmetic ingredients, lubricants, detergents, soaps, perfumes, antimicrobial agents and renewable fuels.

Cross-metathesis of seed-oil derivatives and purified methyl oleate as a model substrate is known. However, these reactions are carried out in organic solvents and a high catalyst loading is required for effective conversion, which limits industrial scale viability of these processes, and particularly ethenolysis.

Purified methyl oleate has been used as a model substrate for metathesis. Relatively high turn over numbers (TONs) have been reported on the alkenolysis of methyl oleate using other olefins as ethylene surrogates in CM reactions. For example, the TON for CM of methyl oleate with propylene and 2-butene has achieved TONs as high as 192,900 and 470,000 respectively. However, metathesis with higher olefins results in the production of substantial amount of internal olefins, which are considered low value products compared to α-olefins produced through ethenolysis.

There remains a need in the art for methods of efficiently producing olefins from renewable fatty acid sources.

SUMMARY OF THE INVENTION

The present invention relates to the conversion of lipids such as plant oils and fatty acid methyl esters of plant oils, including canola oil, canola oil methyl esters or CMEs, recycled or waste cooking oil, and lipids extracted from animal sources, such as spent fowl, using ruthenium metathesis catalysts under microwave irradiation, to produce olefins. In one embodiment, the metathesis reactions are conducted under solvent-free microwave conditions and may provide relatively higher TON rates.

In one aspect, the invention may comprise a method of conversion of a lipid to an olefin product, comprising the steps of heating a mixture of unsaturated triacylglycerols or alkyl esters of unsaturated fatty acids and a reactant olefin with microwave irradiation, in the presence of a ruthenium complex catalyst. In some embodiments, the unsaturated triacylglycerols comprises a vegetable oil or a waste cooking oil, or wherein the alkyl esters of unsaturated fatty acids comprise methyl esters of fatty acids derived from a vegetable oil or waste cooking oil. The vegetable oil may comprise canola oil. The reactant olefin may comprise ethylene or 1,5-hexadiene. The ruthenium complex catalyst comprises one of Grubb's 1st generation or 2nd generation catalyst or Hoveyda-Grubb's 1st generation or 2nd generation catalyst, and may be present in a concentration between about 0.005 mole % and 0.5 mole %. The mixture may be heated to a temperature between about 30° C. and 80° C., preferably about 50° C. The reaction time may be between about 3 minutes to about 10 minutes, including ramping time and hold time.

In a preferred embodiment, the reactant mixture does not include a solvent.

In one embodiment, the unsaturated triacylglycerols may be derived from spent hen, extracted from spent hen using a solvent heated by microwave irradiation.

In preferred embodiments, very high effective TONs were achieved in ethenolysis and alkenolysis of canola oil methyl esters (CMEs) using ethylene and 1-5 hexadiene. Complete conversions were observed at 50° C. within few minutes.

BRIEF DESCRIPTION OF THE DRAWINGS

The drawings attached to or embedded in the description form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1A:
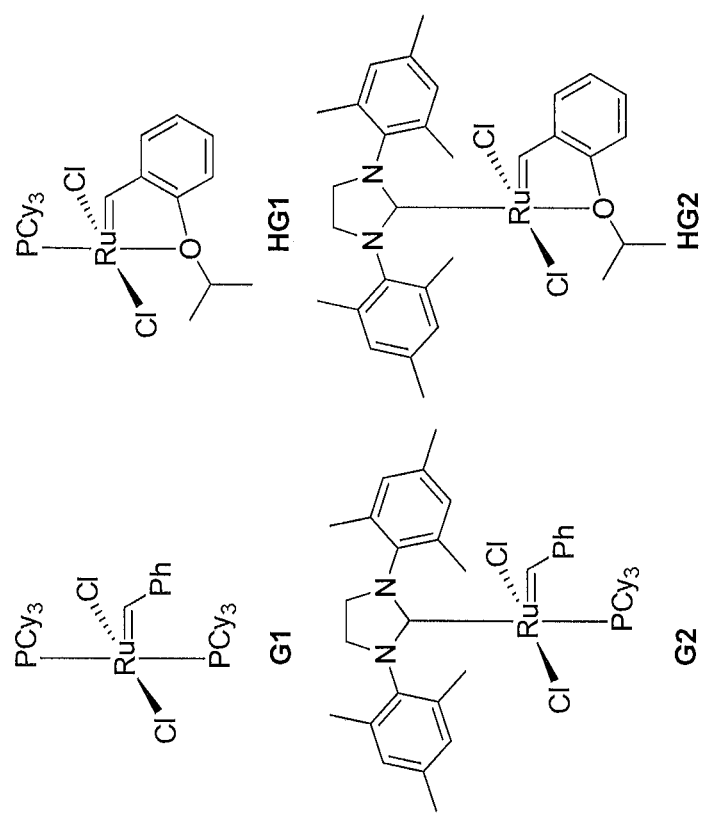
FIG. 1A shows Grubbs (G) and Hoveyda-Grubbs (HG) first and second generation (1&2) catalysts.

The present invention relates to methods of converting unsaturated lipids into olefins. In one embodiment, the method comprises the metathesis of unsaturated triacylglycerols or alkyl esters of unsaturated fatty acids, with olefins such as ethylene and 1,5-hexadiene, with microwave irradiation and ruthenium complex catalysts, to produce alpha-olefins. Various embodiments encompass varying conditions, and different combinations of conditions, such as catalysts, their concentration, and time and temperature of reaction.

Use of microwave electromagnetic radiation for the cross metathesis reactions of vegetable oils with ethylene and 1,5-hexadiene may provide high conversion rate, TONs and turn over TOFs in a relatively short reaction time, preferably without any solvent at a relatively low concentration of ruthenium based catalysts. Thus, the present methods may provide rapid and effective conversions of renewable oil and oil derivatives into useful chemicals.

The unsaturated fatty acids are preferably derived from a renewable source, such as unsaturated plant oils or from waste animal sources. In one embodiment, the unsaturated plant oil may comprise canola oil or a waste or used cooking oil. Triacylglycerols (TAGs) may be converted directly, or may first be transesterified to produce alkyl esters using known methods, such as with methanol, from which saturated esters may be substantially removed, for example via crystallization at lower temperature of −5° C. in the presence of acetone. When canola oil is transesterified with methanol, the resulting mixture of fatty acid esters (canola methyl esters or CME) comprises methyl oleate (67%), methyl linoleate (22%), and methyl linolenate (1%) with small quantities of some other saturated and unsaturated esters.

Olefin metathesis (OM) for the conversion of oleochemicals into valuable products has been facilitated by the well-defined, functional-group tolerant ruthenium alkylidene complexes developed by Grubbs et al.[31] These catalysts can be handled in air and react selectively with olefins in the presence of various functional groups. However, the ratio of the rate of metathesis over the rate of catalyst decomposition determines the efficiency of an olefin metathesis catalyst. Reaction temperature and the use of solvents are known to impact catalyst efficiency and decomposition. Catalyst decomposition during extended reaction times and temperatures significantly affect TONs and product selectivity. However, the selectivity of ruthenium complexes for the production of α-olefins has been reported as poor.

In one embodiment, the method comprises a rapid conversion of canola oil and canola methyl esters (CME) and waste cooking oil methyl esters (WOME) into linear α-olefins under solvent-free, microwave-assisted ethenolysis and alkenolysis using ethylene and a diolefin (1,5-hexadiene).

The reaction was investigated using varying reaction conditions, including temperature, time, catalysts screening and concentrations.

Figure 1B:
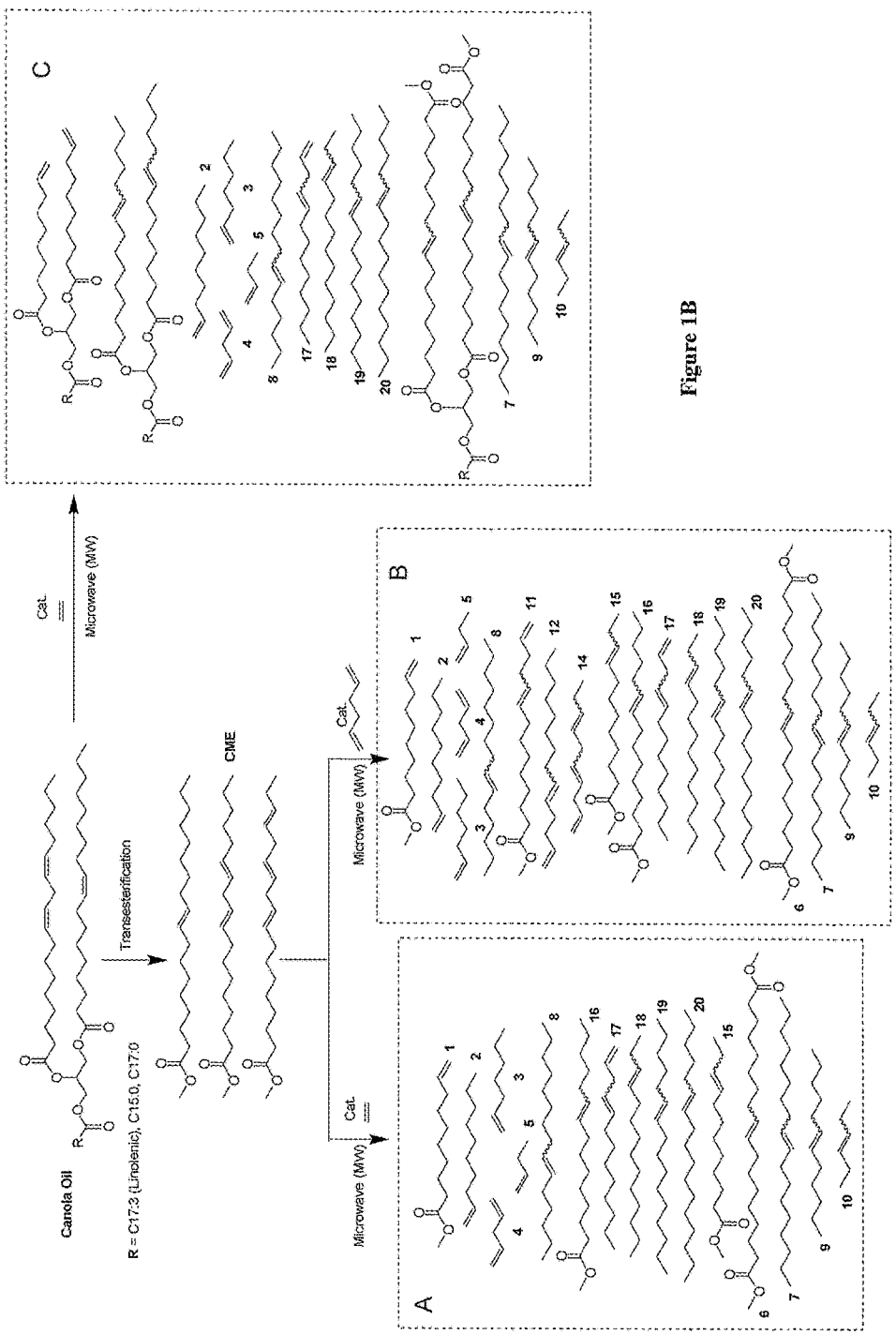
FIG. 1B shows a scheme showing products of ethenolysis (A); alkenolysis (B) of canola methyl esters (CME) waste cooking oil methyl esters (WOME) and direct ethenolysis of canola oil (C) under microwave conditions.

For ethenolysis reactions of CME, a group of four different ruthenium based catalysts (Grubbs (G1 and G2) and Hoveyda-Grubbs (HG1 and HG2) shown in FIG. 1, was screened to assess their suitability under microwave irradiations at a temperature of about 50° C. for about 8 minutes (3 minutes ramping time+5 minutes hold time). The initial reactions were performed with catalyst loading of 0.1 mole % (moles of catalyst per mole of substrate). the second generation catalysts (G2 & HG2) displayed better transformation of reactants into metathesis products compared to the first generation catalysts (G1 & HG1). The G2 catalyst was found more active under microwave conditions, and 0.5 mole % of G2 resulted in 98% conversions within about 2 to about 5 minutes. Under the same reaction conditions, G2 & HG2 displayed higher conversion rates (96%) with good selectivity, yield, TON and TOF compared to G1 and HG1, which had conversion rates of 65% and 64% respectively. Considering higher conversion rates of second generation catalysts, G2 & HG2 were further investigated using lower catalyst loading (0.05 mole %) and shorter reaction time of 3.5 minutes (3 minutes of ramping time+thirty seconds hold time). Despite 50% decrease in catalyst loadings of G2 & HG2, from 0.1 mole % to 0.05 mole %, the conversion rates did not change significantly (95% and 96% respectively). However, a decrease in selectivity and yield for catalyst G2 was observed. Compared to G2, HG2 displayed higher selectivity (65%) and yield (84%).

Accordingly, HG2 may be a preferred catalyst under solvent free microwave conditions. HG2 catalyst was further studied at different temperatures (40, 50, 60 and 80° C.) and with lower catalyst loadings to optimize yield, selectivity, TONs and TOFs. An efficient conversion (96%) was still reached at all temperatures with 0.1 mole % of HG2 catalyst loading. However, lower selectivity, yield and TONs was observed at 40° C. Ethenolysis at a temperature of 50° C. resulted in better selectivity (66%), yield (88%) and TON compared to the reactions performed at 60° C. and 80° C. The increased temperature of 60° C. and 80° C. may have induced early decomposition of catalyst, which may account for reduced TON. These investigations indicate that the solvent free microwave-assisted metathesis reactions may take place in a range of about 40 to about 80 degrees, and preferably at about 50° C.

Figure 2:
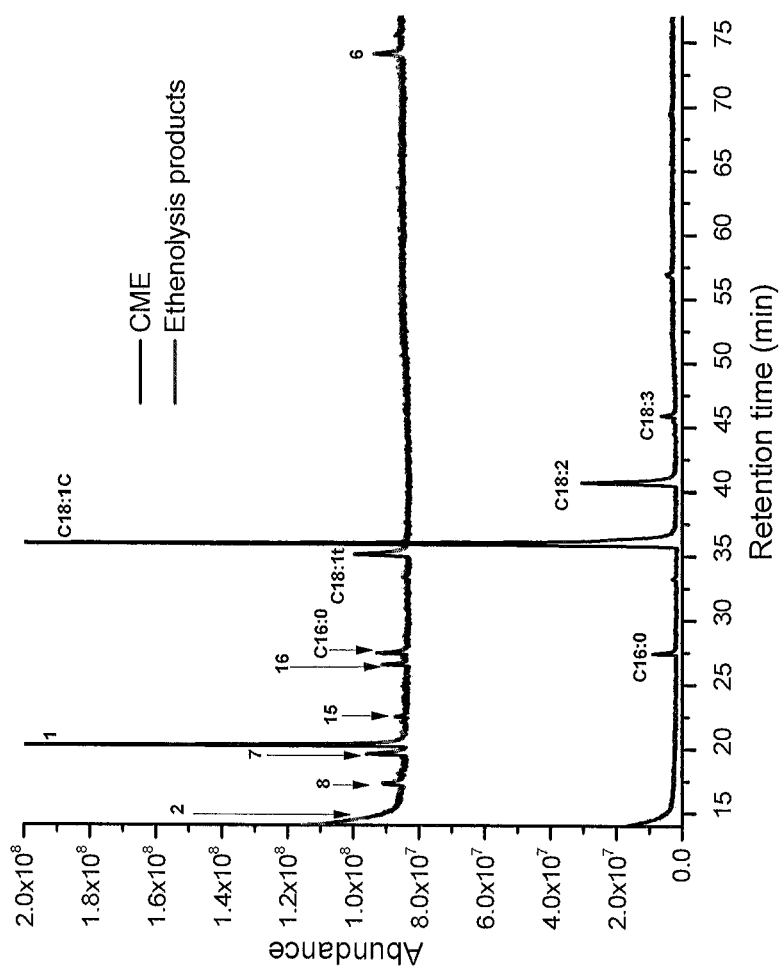
FIG. 2 shows GCMS spectrum of canola methyl esters (CME) and ethenolysis products.

Further ethenolysis reactions of CME were performed with lower concentration of HG2 catalyst. Further lowering the catalyst loading of HG2 from 0.05 to 0.01 mole % resulted in a significant increase in TON, TOF with 70% yield and 60% selectivity for ethenolysis products over self-metathesis products. HG2 maintained higher conversion rate (95%) and exhibited the highest catalytic activity even at the lowest concentration of 0.005 mole %. Surprising TOn and TOF values were obtained when further decreased concentration (0.002 mole %) of HG2 was used. Nevertheless, despite increase in TONy and TOFy, the decrease in loading of HG2 to 0.002 mole % significantly reduced conversion (69%), selectivity (42%) and yield (33%) suggesting that further decrease in catalyst loading will result in lower conversion, yield and selectivity. The possible terminal and internal olefins obtained after catalytic transformation of CME with ethylene are shown in the scheme shown in FIG. 1B, and were characterized by GCMS analysis (FIG. 2). For complete identification, the mixture was separated into 3 fractions; volatiles, hydrocarbons and esters.

Although increased TON without decrease in conversion rate were achieved by lowering the catalyst loading from 0.1 mole % to 0.002 mole % but yield and selectivity gradually decreased from 88% to 33% and 66% to 42% respectively. It has also been observed that decrease in reaction times under microwave irradiation resulted in higher conversion rate giving a record number of TOFs.

Figure 3:
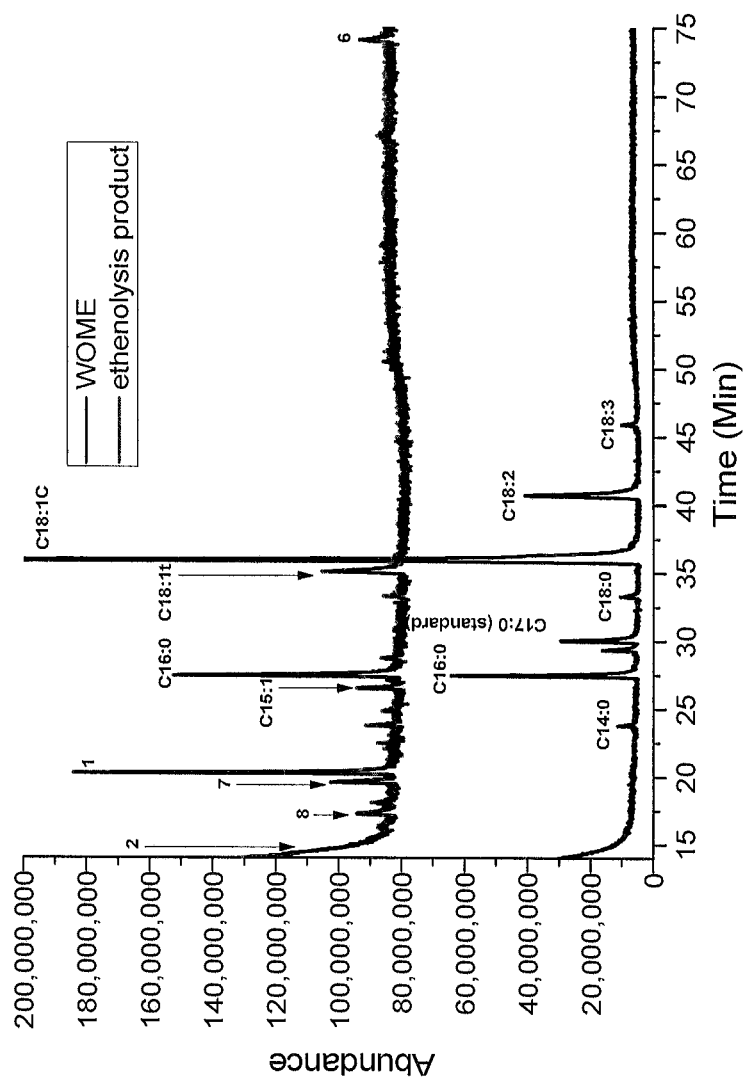
FIG. 3 shows GCMS spectrum of waste cooking oil methyl esters (WOME) and its metathesis products with ethylene

Ethenolysis of waste cooking oil methyl esters (WOME) was carried out under conditions found to be optimal for ethenolysis of CME, but with different catalyst loadings of HG2. A highest conversion rate of 96% was observed with all catalyst loadings (0.1 mole % to 0.005 mole %) in one minute of reaction time. With 0.1 mole % of catalyst loading, 63% selectivity and 75% yield was obtained. Decreasing the catalyst contents to 0.005 mole % resulted in a drop of selectivity to 59% and yield to 72%, while enhanced values of TON and TOE were obtained. mThe product components obtained after ethenolysis of WOME were characterized by GC analysis (FIG. 3) and found to be similar to those described for the ethenolysis of CME (FIG. 2).

Figure 4:
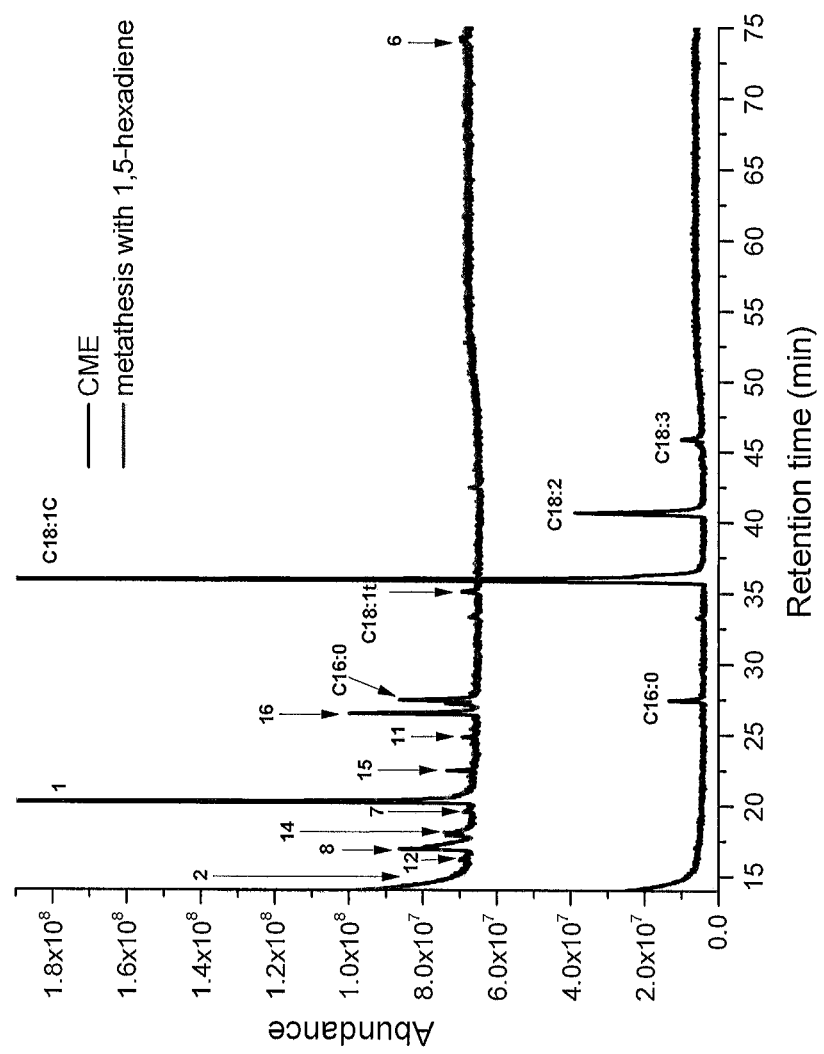
FIG. 4 shows GCMS spectrum of canola methyl esters (CME) and alkenolysis products.

Despite higher TONs than ethenolysis, alkenolysis with higher olefins typically results in substantial amounts of undesired internal olefins. The cross-metathesis with diolefin such as 1,5-hexadiene should results in terminal metathesis products due to the presence of both terminal double bonds (FIG. 4). Therefore, alkenolysis of canola methyl esters with 1,5-hexadiene was also performed using microwave radiations. Similar to ethenolysis, G1, G2, HG1 and HG2 were screened with 0.1 mole % catalyst loadings at 50° C. temperature. No reaction products were observed with 0.1 mole % of first generation catalysts (G1 & HG1) for 8 minutes reaction time under microwave conditions. Surprisingly, G2 & HG2 gave the highest conversion rate of 99% within about 8 minutes (~3 minutes of ramping time+5 minutes hold time) with effective TON. While 81% selectivity and 96% yield was achieved with G2, which is slightly higher compared to 73% selectivity and 92% yield obtained by HG2 catalyst. Both of these catalysts further studied at lower catalyst loading of 0.05 mole % for a reaction time of ~3.5 min (~3 min ramping time+30 seconds hold time). A sharp decrease in conversion rate, yield and TONs were observed with catalyst G2, the conversions decreased to 27%, yield declined from 96% to 23%, with modest selectivity of 73%. While in case of HG2, improved selectivity (82%), yield (99%), TONs as well as TOFs were observed with similar conversion rate. These results suggest that HG2 is a preferred catalyst for alkenolysis of fatty acid esters under microwave conditions.

Decreasing the catalyst loading to 0.01 mole % still provided high conversions with slight decrease in selectivity and yield, with a significant increase in TON and TOF. Further lowering of catalyst contents below 0.01 mole % resulted in a very low conversions for alkenolysis reactions.

Generally speaking, olefin metathesis is an equilibrium process. Although kinetic products can be isolated under certain specific conditions, generally alkylidene complexes can be identified when there are higher concentrations of olefins in the mixture. Therefore, the olefins used for the cross-metathesis reactions of the present invention may comprise the formula shown below, where R=H, ethyl, pentyl, octyl, 2-propenyl, 3-butenyl, undec-2-enyl, dodec-3-enyl, and oct-2,5-dienyl. Potential alkylidene complexes with the catalysts are shown below:

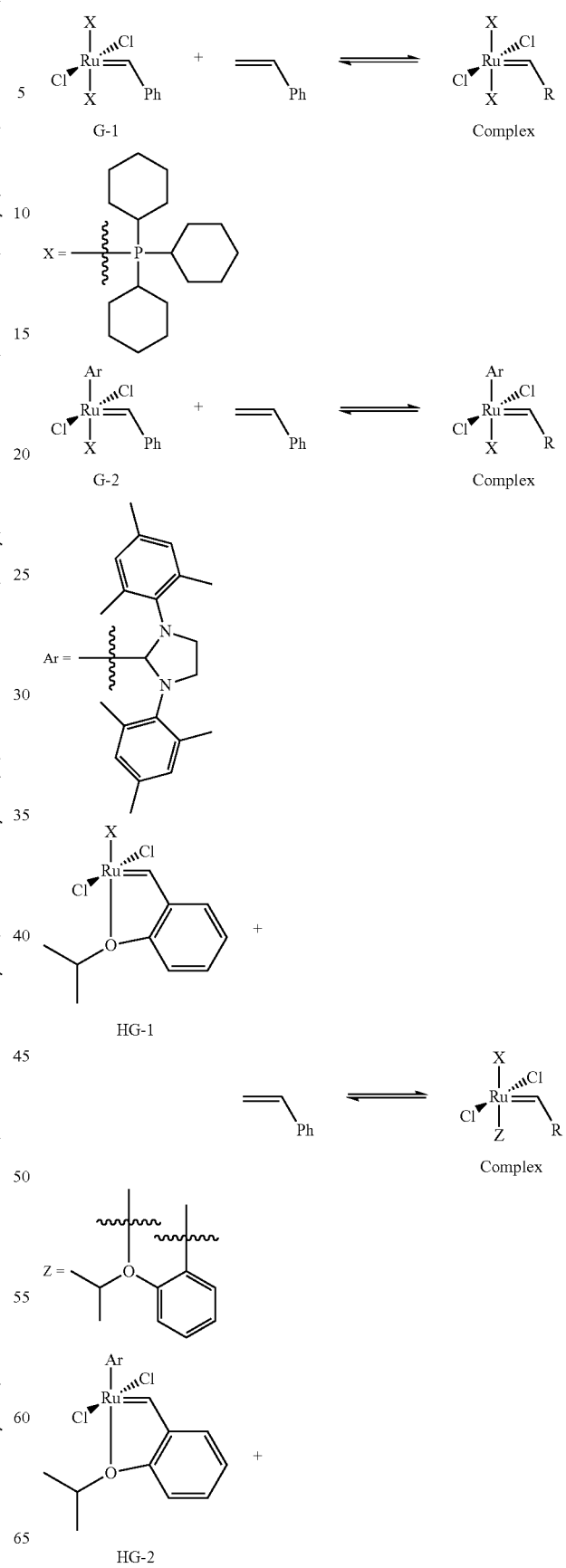

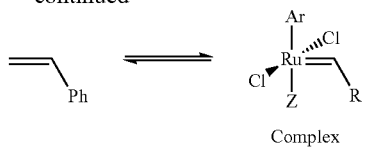

Complex

Figure 5:
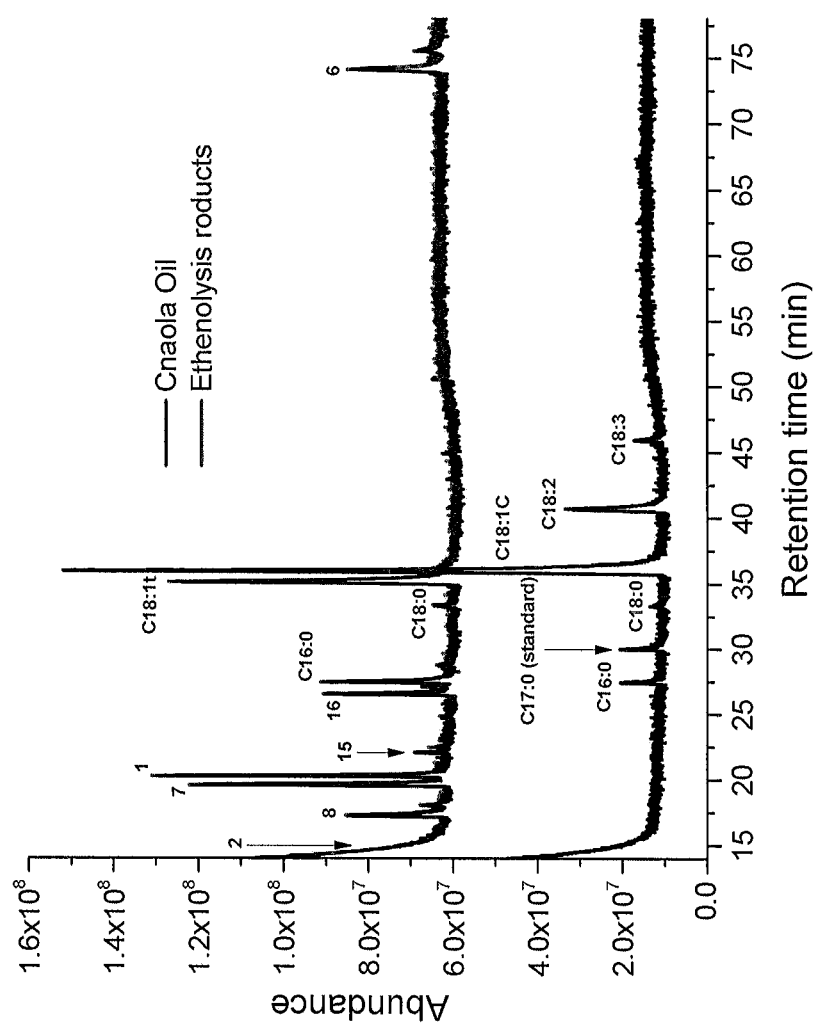
FIG. 5 shows GCMS spectrum of canola oil and its metathesis products with ethylene.

R = H, ethyl, pentyl, octyl, 2-propenyl, 3-butenyl, undec-2-enyl, dodec-3-enyl, and oct-2,5-dienyl Direct ethenolysis of canola oil was also studied under similar conditions mentioned for ethenolysis of CME. More than 94% conversions were obtained in one minute of reaction time with two different loadings of HG2 catalyst (0.05 mole %, and 0.01 mole %). Anomalous behavior can be seen, as 4% selectivity and 34% yield was obtained with 0.05 mole % catalyst loading, while an increased selectivity (19%) and yield (49%) was achieved, when catalyst loading was lowered to 0.01 mole %. In spite of higher conversion rate, lower selectivity and yield was obtained, as most of the reactant component cis-oleate (C18:1 C, FIG. 5) has transformed into trans-oleate (C18:1 t) during the reaction. This could be the result of uncontrolled and/or lower ethylene pressure, as it was maintained manually. A notable increase in TON and TOF were observed, when catalyst contents were decreased from 0.05 mole % to 0.01 mole %. The mixture of metathesis products obtained (Scheme 2) was transesterified before characterization with GCMS (FIG. 5).

Ethenolysis of methyl oleate has been extensively studied in the prior art. To compare the ethenolysis results of renewable fatty acid esters, ethenolysis of methyl oleate was performed in the same manner as described herein for canola methyl esters, Cross metathesis of methyl oleate with ethylene results in the formation of two cross 1 (methyl 9-decenoate) and 2 (1-decene) and two self 6 (dimethyl 9-octadecene-1,18-dioate) and 7 (9-octadecene) metathesis products as these products are shown in FIG. 2. Ethenolysis of methyl oleate was conducted using HG2 catalyst with two different concentration of 0.005 and 0.01 mole % providing almost 94% conversion in all cases. A good yield (72%), selectivity (65%) and TON were obtained with 0.01 mole % loading of catalyst, whereas decreasing catalyst loading to 0.005 mole %, a substantial decrease in yield (40%), selectivity (36%) and TON were observed. The TON's calculated on the basis of yield was found to be highest with 0.005 mole % loading of catalyst.

Without restriction to a theory, the lower yield and selectivity even with higher conversion rate in case of 0.005 mole % loading of catalyst are likely due to formation of trans methyl oleate during the reaction.

The results of methyl oleate displayed slightly lower yield, selectivity and TON's when compared with ethenolysis of CME. With catalyst loading of 0.01 mole %, the observed ethenolysis TON for methyl oleate were found to be 20% less than the TON obtained after ethenolysis of CME. Lowering the catalyst loading to 0.005 mole % in the reaction of methyl oleate ethenolysis, resulted in a significant decrease in TON, while ethenolysis of CME still displayed an efficient value of TON. The less yield, selectivity and TON's in case of methyl oleate ethenolysis can be attributed to less purity of methyl oleate (99%) as it effects the efficiency of reaction[59].

In an alternative embodiment, the lipids may be sourced from a renewable or waste animal byproduct. For example, spent hens are a poultry industry byproduct and may be used as a potential source of lipids. In the poultry industry, manufacturers have few ways and means of disposing spent flocks, not all of which are economically feasible. A whole spent hen has ~1.8 kg meat and on average the whole spent hen contains about 15% fat, which represents a significant resource of lipids which could be utilized. Lipids may be extracted from ground spent fowl using microwave extraction, for example.

Figure 6:
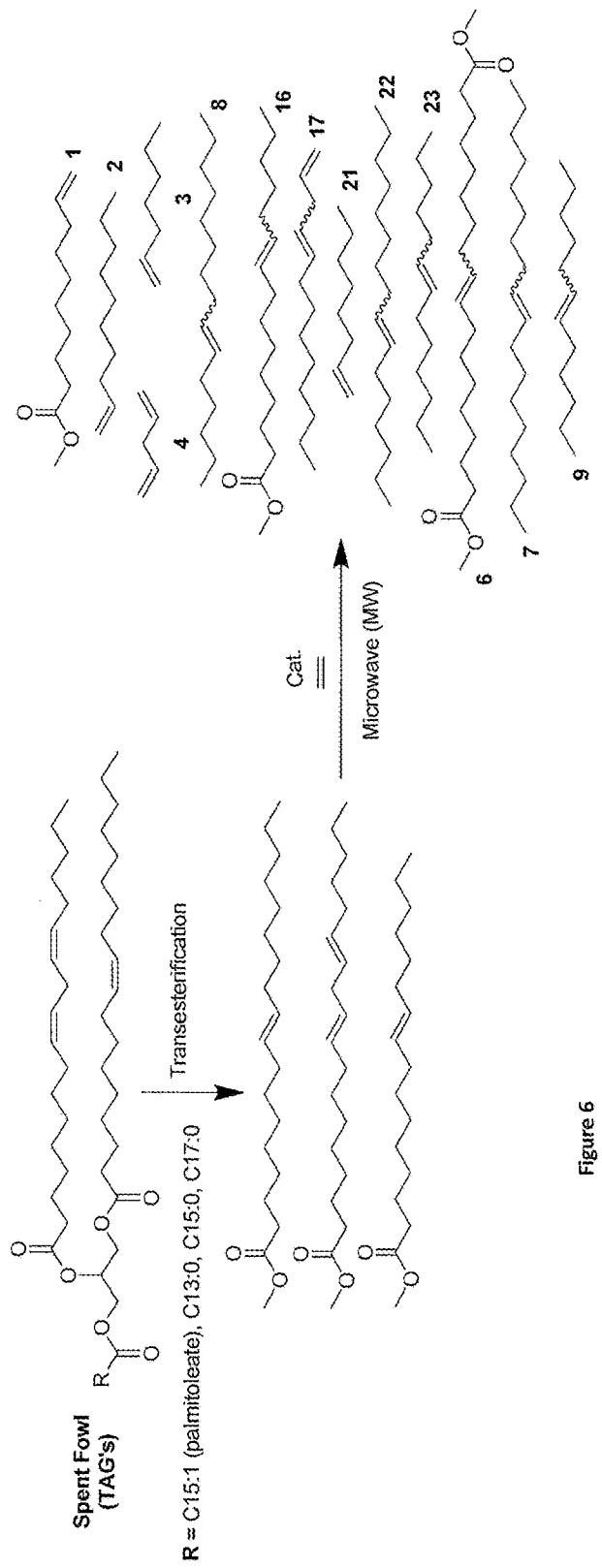
FIG. 6 shows a scheme showing possible products from ethenolysis of chicken FAME's (CF) under microwave conditions.
Figure 7:
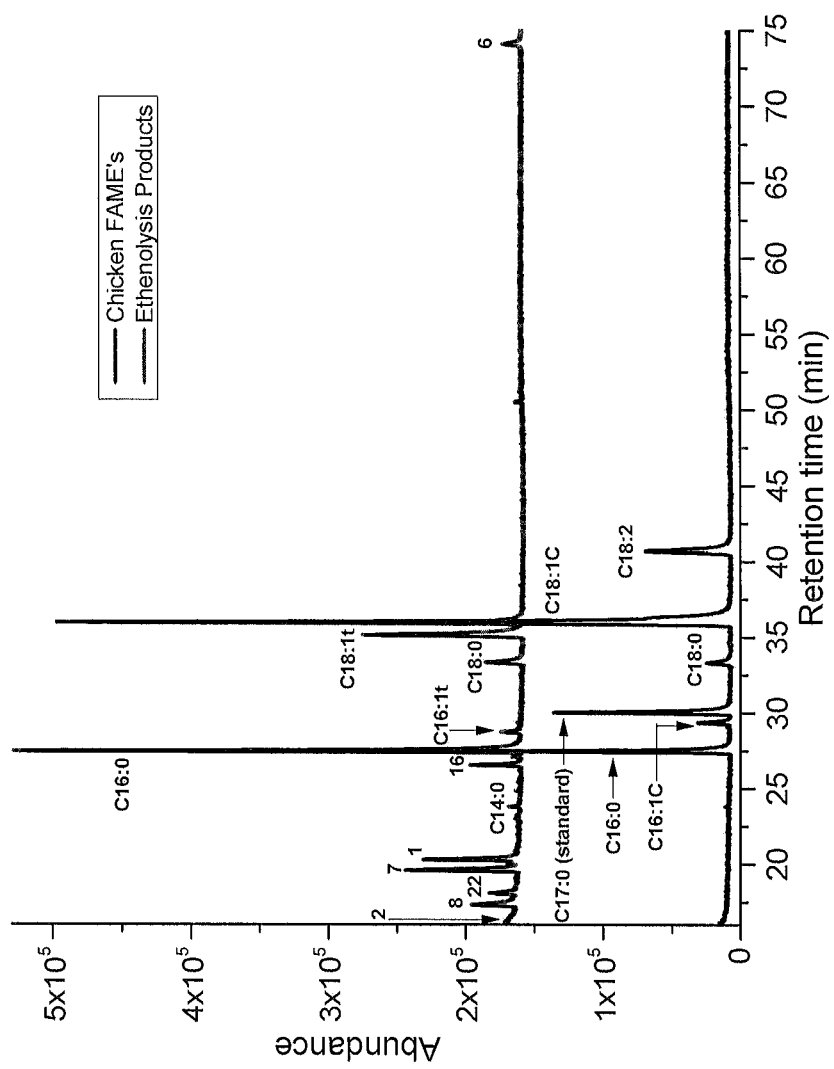
FIG. 7 shows GCMS spectrum of Chicken FAME's (CF) and its ethenolysis products.

Therefore, microwave assisted ethenolysis of fatty acid methyl esters (FAMEs) derived from spent fowl was conducted using G2 and HG2. The possible products after ethenolysis of spent fowl FAME's are shown in the scheme shown in FIG. 6, while the products obtained and identified by GCMS are shown in FIG. 7. In one embodiment, the reactions were performed using G2 and HG2 catalysts with loadings of 0.01 mole %. Among these two catalysts, HG2 displayed better conversion rate (92%) as compared to G2, which showed only 64% conversion. GCMS spectrum of FAME's after treatment with HG2 catalyst (FIG. 7) also shows maximum conversion of starting materials (methyl oleate, C18:1 and methyl linoleate, C18:2) into metathesis products. Over all, HG2 catalyst was found to be effective providing 44% selectivity, 57% yield, while G2 catalyst gave 47% selectivity, 36% yield. Depending on these results, HG2 catalyst was further used with lower loading of 0.005 mole %. A good conversion rate (82%), selectivity (45%) and yield (50%) were obtained representing highest value of effective TON's and TOF.

Examples

All reactions described herein were performed on a CEM-Discover (120 V, Matthews, USA), a source of microwave irradiation in 10 mL sealed tube, while infrared mode was used to measure the temperature of the reaction contents. To identify the components, GC-MS analyses of all samples were conducted on Agilent 6890N (USA) gas chromatograph, fitted with a fused silica capillary column SP2560 (100 m×0.25 mm×0.2 μm film thickness) and detector 5975B inert XL MSD. The sample volume of 2 μL was injected, while the injector temperature was set to 240° C. and a split mode with ratio of 20:1 was used. The initial temperature of oven was set to 45° C. and held for 4 minutes. The temperature was then increased to 175° C. with a ramp rate of 13° C. min$^{-1}$; hold for 27 minutes, and further ramped at 4° C. min$^{-1}$ to 215° C. and hold for 35 minutes. The mass scanning range of 30-1000 amu at 1.55 scan per second was performed. Helium gas was used as a mobile phase with a constant flow rate of 1.3 mL/min.

The hydrocarbon fractions were characterized on Agilent 7980A (USA) instrument using HP5 column (30 m×0.32 mm×0.25 μm film thickness), coupled with inert EI MSD with triple axis detector (5975C, Agilent, USA). The injection volume of 1 μL was used with injector temperature of 250° C. in a splitless mode. The oven initial temperature of 50° C. was set and held for two minutes. The temperature was increased at a ramp rate of 5° C. min$^{-1}$ to 325° C. and then held for five minutes. The MS scanning range of 50-600 amu was applied with a scan rate of 2.66 per second. A constant flow rate of 4.4 mL/min of helium gas was used as mobile phase.

While Perkin Elmer GC-FID Clarus 500 instrument (USA) equipped with flame ionization detector was used for quantitative analysis to measure the conversion rate, selectivity and yield of all samples. The temperature was set at 280° C. for detector, while 240° C. for injector. The air and hydrogen gases were used as a carrier with the flow rate of 450 and 45 mL/min respectively. While the column used and rest of the conditions were same as mentioned above for GC-MS instrument Agilent 6890N.

$^1$H NMR spectra of selected samples were recorded after dissolving in deuterated chloroform at 400 MHz frequency on a Varian INOVA instrument at a temperature of 27° C.

Canola oil, methyl oleate (97%), Grubb's catalyst 1$^{st}$ generation (G1, 97%), Grubb's catalyst 2$^{nd}$ generation (G2), Hoveyda-Grubb's catalyst 1$^{st}$ generation (HG1), Hoveyda-Grubb's catalyst 2$^{nd}$ generation (HG2, 97%), 1,5-hexadiene (97%), ethyl vinyl ether (≥98%), potassium hydroxide (≥85%), sodium chloride (≥99.5%), anhydrous sodium sulphate (≥99%), dichloromethane (≥99.5%), methanol (≥99.8%) and acetone (≥99.9%) were obtained from sigma Aldrich. While ethylene gas (Mathesons, polymer grade, CAS: 74-85-1), silica gel used for column chromatography (70-230 mesh, 60 Å), flash silica (Silicycle, 40-63 µm, 230-400 mesh), thin layer aluminium chromatographic plates (Macherey-Nagel, 0.20 mm thick, 20×20 cm size, UV254), ethyl acetate (fisher, 99.9%), n-hexane (Caledon) were purchased and used as such.

Methanolic Transesterification of Canola Oil and Waste Cooking Oil.

Methanolic transesterification of canola oil and waste cooking oil into their fatty esters was performed using KOH as a base according to the published method of Arshad, M. et al. _ENREF_60$^{65}$ Separation of Saturated Esters by Crystallization Method.

For best results in metathesis reactions, saturated esters were removed from transesterified canola methyl esters (CME) and waste cooking oil methyl esters (WOME) by a crystallization method. Separation by column chromatography is difficult due to their almost same $R_f$ value. For their separation, these esters were dissolved in acetone and kept overnight at a temperature of −5° C. The volume of acetone used was equal to the volume of esters. Saturated esters solidify at this lower temperature and were separated by filtration at similar temperature. This process was repeated three times to remove maximum amount of saturated esters. The obtained esters which were mostly unsaturated were dried and passed through a column of flash silica before proceeding for metathesis reactions.

General Procedure for Ethenolysis of Methyl Fatty Esters.

Specific amount methyl fatty esters were charged in a 10 mL glass vial having Teflon™ coated stirring bar and was purged with nitrogen gas for five minutes. An appropriate amount of catalyst was weighed in a glove box under an atmosphere of nitrogen and was added into the reaction vial. The reaction vial was sealed and brought to the ethylene line. The reaction vessel was purged with ethylene gas for five minutes and then ethylene was liquefied into the reaction vial to a volume of about 0.05 mL by cooling the vial in liquid nitrogen. The reactions were conducted in sealed reaction vessels at specified temperatures. Microwave power was varied by the instrument in order to reach and maintain the set temperature. The reactions were run in duplicate and in some cases in triplicate runs were carried out. The pressure variation during ethenolysis was between 80 and 120 PSI with an average pressure for each reaction was ~100 PSI. The set maximum power for the instrument was 250 W. The reaction was run for specific time interval at a suitable temperature to get maximum conversions of reactants into product components. The ramp time to attain the required temperature was typically about 3 minutes. After reaction completion, ethyl vinyl ether (0.5 mL) was added into the reaction mixture to deactivate the catalyst and was passed through a plug of flash silica to remove the catalyst. The product components were characterized by GCMS and quantified with GC-FID by considering naturally occurring methyl palmitate (C16:0) in the canola oil and/or methyl heptadecanoate (C17:0) as an internal standard.

Ethenolysis of Canola Oil.

Canola oil was first passed through a column of flash silica and anhydrous magnesium sulphate to remove colored pigments and moisture contents. Afterwards, it was proceeded for cross metathesis reactions with ethylene in the presence of catalyst HG2 using identical conditions and/or methodology as mentioned for ethenolysis of CME.

Separation of Components

A volatile fraction was collected right after the completion of ethenolysis reaction containing 1,4-petadiene (4) and 1-butene (5) and was characterized by GCMS (Figure X supplementary information). The remaining mixture of ethenolyzed components were separated into three major fractions; hydrocarbons, methyl esters and pure dimethyl octadec-9-enedioate (6) with the help of silica gel column chromatography using an eluent system of 1-5% ethyl acetate in hexane. These fractions were further characterized by GCMS (supporting info). The hydrocarbon and methyl esters fractions were subjected to distillation separately to purify some of the major components. $^1$H NMR of those purified components is provided in the supporting info.

Cross Metathesis of Canola Methyl Esters with 1,5-Hexadiene.

In a glove box under an inert atmosphere of nitrogen, an appropriate amount of catalyst was weighed and added into the reaction vile containing purified canola methyl esters (1 Eq.) degassed with inert nitrogen and equipped with a stirring bar. The reaction vessel was sealed and purged with nitrogen gas for five minutes followed by the addition of 1,5-hexadiene (2 Eq.) with the help of glass syringe. The sealed reaction vessel was placed in a microwave reactor having similar reaction conditions as have been mentioned for ethenolysis of CME. After reaction completion, ethyl vinyl ether (0.5 mL) was added into the reaction mixture to deactivate the catalyst and was passed through a plug of flash silica to remove the catalyst contents. The product components were characterized by GCMS and quantified with GC-FID by considering naturally occurring methyl palmitate (C16:0) in the canola oil and methyl heptadecanoate (C17:0) as an internal standard.

Extraction of Lipids from Chicken Using 80 mL Microwave Vessel Assembly

The following conditions were used for the extraction of lipids using microwave from the fresh ground chicken.

| Temperature (° C.) | Hold Time (minutes) | Pressure (Psi) | Power (W) | Stirring | MaxPower | Recovery of lipids (%) |
|---|---|---|---|---|---|---|
| 80 | 10 | 250 | 250 | High | On | 99.77 |

Around 15 g of ground chicken was treated with the microwave, twice. The first treatment was in 25 mL of hexane as solvent and the second with 25 mL of chloroform. The extracts were then combined and filtered using filter paper. Sodium sulfate was used to remove the moisture from the extract. The solvents were then evaporated with a rotary evaporator. Several repetitions were made to extract the crude lipids in large quantity.

Methanolic Transesterification of Triacylglycerides from Spent Fowl.

Methanolic transesterification of triacylglycerides extracted from spent fowl was performed using KOH as a base according to the published method of Arshad, M. et al.[65]

_ENREF_60 The transesterified fatty acid methyl esters (FAME's) were purified by silica gel column chromatography using an eluent mixture of 1% ethyl acetate in hexane. The pure FAME's were passed through a column of flash silica and anhydrous sodium sulphate prior to use.

General Procedure for Ethenolysis of FAME's from Spent Fowl.

A Specific amount FAME's derived from spent fowl were charged in a 10 mL glass vial having Teflon™ coated stirring bar and was purged with nitrogen gas for five minutes. An appropriate amount of catalyst was weighed in a glove box under nitrogen atmosphere and was added into the reaction vial. The reaction vial was sealed and brought to the ethylene line. The reaction vessel was purged with ethylene gas for five minutes and then ethylene was liquefied into the reaction vial to a volume of about 0.5 mL by cooling the vial in liquid nitrogen. The reactions were conducted in sealed reaction vessels at specified temperatures. The power is usually adopted by the instrument to reach and maintain the set temperature. The reactions in duplicate runs were carried out. The pressure variation during ethenolysis was between 100 and 150 PSI with an average pressure for each reaction was ~120 PSI. The set maximum power for the instrument was 250 W. The reaction was run for specific time interval at a suitable temperature to get maximum conversions of reactants into product components. The ramp time to attain the required temperature was ~3 minutes. After reaction completion, the reaction mixture was passed through a plug of flash silica to remove the catalyst. The product components were characterized by GCMS and quantified with GC-FID by considering naturally occurring methyl palmitate (C16:0) in the fats of spent foul and/or methyl heptadecanoate (C17:0) as an internal standard.

Definitions and Interpretation

All terms and phrases used in this specification have their ordinary meanings, as one of skill in the art would understand, except where specifically defined. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims. References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The corresponding structures, materials, acts, and equivalents of all means or steps plus function elements in the claims appended to this specification are intended to include any structure, material, or act for performing the function in combination with other claimed elements as specifically claimed.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

REFERENCES

The following references are incorporated by reference herein for all purposes, where permitted, as though reproduced herein in their entirety.

1. Mecking, S., Nature or Petrochemistry?—Biologically Degradable Materials. *Angew. Chem. Int. Ed.* 2004, 43, 1078-1085.
2. Dodds, D. R.; Gross, R. A., Chemicals from Biomass. *Science* 2007, 318, 1250-1251.
3. Chikkali, S.; Mecking, S., Refining of Plant Oils to Chemicals by Olefin Metathesis. *Angew. Chem. Int. Ed.* 2012, 51, 5802-5808.

4. Anastas, P. T.; Kirchhoff, M. M., Origins, Current Status, and Future Challenges of Green Chemistry. *Acc. Chem. Res.* 2002, 35, 686-694.
5. Corma, A.; Iborra, S.; Velty, A., Chemical Routes for the Transformation of Biomass into Chemicals. *Chem. Rev.* 2007, 107, 2411-2502.
6. Vennestrom, P. N. R.; Osmundsen, C. M.; Christensen, C. H.; Taarning, E., Beyond Petrochemicals: The Renewable Chemicals Industry. *Angew. Chem. Int. Ed.* 2011, 50, 10502-10509.
7. Biorefineries—industrial processes and products: status quo and future directions. Kamm, B.; Gruber, P. R.; Kamm, M., Eds. Wiley-VCH: Weinheim; 2006.
8. Öztürk, B. Ö.; Topoğlu, B.; Karabulut Şehitoğlu, S., Metathesis reactions of rapeseed oil-derived fatty acid methyl esters induced by monometallic and homobimetallic ruthenium complexes. *Eur. J. Lipid Sci. Tech.* 2015, 117, 200-208.
9. Biermann, U.; Bornscheuer, U.; Meier, M. A. R.; Metzger, J. O.; Schafer, H. J., Oils and Fats as Renewable Raw Materials in Chemistry. *Angew. Chem. Int. Ed.* 2011, 50, 3854-3871.
10. Meier, M. A. R.; Metzger, J. O.; Schubert, U. S., Plant oil renewable resources as green alternatives in polymer science. *Chem. Soc. Rev.* 2007, 36, 1788-1802.
11. Carlsson, A. S.; Yilmaz, J. L.; Green, A. G.; Stymne, S.; Hofvander, P., Replacing fossil oil with fresh oil—with what and for what? *Eur. J. Lipid Sci. Tech.* 2011, 113, 812-831.
12. Biermann, U.; Friedt, W.; Lang, S.; Luhs, W.; Machmuller, G.; Metzger, J. O.; Rüsch gen. Klaas, M.; Schäfer, H. J.; Schneider, M. P., New Syntheses with Oils and Fats as Renewable Raw Materials for the Chemical Industry. *Angew. Chem. Int. Ed.* 2000, 39, 2206-2224.
13. Schieb, P. A., Biorefinery 2030: future prospects for the bioeconomy. Lescieux-Katir, H.; Thenot, M.; Clement-Larosiere, B., Eds. Springer Berlin Heidelberg 2015; p 160.
14. Takahira, Y.; Morizawa, Y., Ruthenium-Catalyzed Olefin Cross-Metathesis with Tetrafluoroethylene and Analogous Fluoroolefins. *J. Am. Chem. Soc.* 2015, 137, 7031-7034,
15. Grubbs, R. H.; Wenzel, A. G.; O'Leary, D. J.; Khosravi, E., Handbook of metathesis. Second edition. ed.; Grubbs, R. H.; Wenzel, A. G.; O'Leary, D. J.; Khosravi, E., Eds. Wiley-VCH: Weinheim 2015. doi:10.1002/9783527674107.
16. Grubbs, R. H., Olefin-Metathesis Catalysts for the Preparation of Molecules and Materials (Nobel Lecture). *Angew. Chem. Int. Ed.* 2006, 45, 3760-3765.
17. Chauvin, Y., Olefin Metathesis: The Early Days (Nobel Lecture). *Angew. Chem. Int. Ed.* 2006, 45, 3740-3747.
18. Schrock, R. R., Multiple Metal-Carbon Bonds for Catalytic Metathesis Reactions (Nobel Lecture). *Angew. Chem. Int. Ed.* 2006, 45, 3748-3759.
19. Basra, S.; Blechert, S., Chapter 12—Ring Rearrangement Metathesis (RRM)—A New Concept in Piperidine and Pyrrolidine Synthesis. In *Strategies and Tactics in Organic Synthesis*, Michael, H., Ed. Academic Press 2004; Vol. Volume 4, pp 315-346.
20. Hoveyda, A. H.; Zhugralin, A. R., The remarkable metal-catalysed olefin metathesis reaction. *Nature* 2007, 450, 243-251.
21. Connon, S. J.; Blechert, S., Recent Developments in Olefin Cross-Metathesis. *Angew. Chem. Int. Ed.* 2003, 42, 1900-1923.
22. Calderon, N., Olefin metathesis reaction. *Acc. Chem. Res.* 1972, 5, 127-132.
23. Mol, J. C., Application of olefin metathesis in oleochemistry: an example of green chemistry. *Green Chem.* 2002, 4, 5-13.
24. Nickel, A.; Pederson, R. L., Commercial Potential of Olefin Metathesis of Renewable Feedstocks. In *Olefin Metathesis*, John Wiley & Sons, Inc. 2014; pp 335-348.
25. Burdett, K. A.; Harris, L. D.; Margl, P.; Maughon, B. R.; Mokhtar-Zadeh, T.; Saucier, P. C.; Wasserman, E. P., Renewable Monomer Feedstocks via Olefin Metathesis: Fundamental Mechanistic Studies of Methyl Oleate Ethenolysis with the First-Generation Grubbs Catalyst. *Organometallics* 2004, 23, 2027-2047.
26. Julis, J.; Bartlett, S. A.; Baader, S.; Beresford, N.; Routledge, E. J.; Cazin, C. S. J.; Cole-Hamilton, D. J., Selective ethenolysis and oestrogenicity of compounds from cashew nut shell liquid. *Green Chem.* 2014, 16, 2846-2856.
27. Herbert, M. B.; Marx, V. M.; Pederson, R. L.; Grubbs, R. H., Concise Syntheses of Insect Pheromones Using Z-Selective Cross Metathesis. *Angew. Chem. Int. Ed.* 2013, 52, 310-314.
28. Marx, V. M.; Sullivan, A. H.; Melaimi, M.; Virgil, S. C.; Keitz, B. K.; Weinberger, D. S.; Bertrand, G.; Grubbs, R. H., Cyclic Alkyl Amino Carbene (CAAC) Ruthenium Complexes as Remarkably Active Catalysts for Ethenolysis. *Angew. Chem. Int. Ed.* 2015, 54, 1919-1923.
29. Jenkins, R. W.; Sargeant, L. A.; Whiffin, F. M.; Santomauro, F.; Kaloudis, D.; Mozzanega, P.; Bannister, C. D.; Baena, S.; Chuck, C. J., Cross-Metathesis of Microbial Oils for the Production of Advanced Biofuels and Chemicals. *ACS Sustain. Chem. Eng.* 2015, 3, 1526-1535.
30. Montero de Espinosa, L.; Meier, M. A. R., Plant oils: The perfect renewable resource for polymer science?! *Eur. Polym. J.* 2011, 47, 837-852.
31. Thomas, R. M.; Keitz, B. K.; Champagne, T. M.; Grubbs, R. H., Highly Selective Ruthenium Metathesis Catalysts for Ethenolysis. *J. Am. Chem. Soc.* 2011, 133, 7490-7496.
32. Marinescu, S. C.; Schrock, R. R.; Müller, P.; Hoveyda, A. H., Ethenolysis Reactions Catalyzed by Imido Alkylidene Monoaryloxide Monopyrrolide (MAP) Complexes of Molybdenum. *J. Am. Chem. Soc.* 2009, 131, 10840-10841.
33. Patel, J.; Elaridi, J.; Jackson, W. R.; Robinson, A. J.; Serelis, A. K.; Such, C., Cross-metathesis of unsaturated natural oils with 2-butene. High conversion and productive catalyst turnovers. *Chem. Commun.* 2005, 5546-5547.
34. van der Klis, F.; Le Nôtre, J.; Blaauw, R.; van Haveren, J.; van Es, D. S., Renewable linear alpha olefins by selective ethenolysis of decarboxylated unsaturated fatty acids. *Eur. J. Lipid Sci. Tech.* 2012, 114, 911-918.
35. Nickel, A.; Ung, T.; Mkrtumyan, G.; Uy, J.; Lee, C. W.; Stoianova, D.; Papazian, J.; Wei, W.-H.; Mallari, A.; Schrodi, Y.; Pederson, R. L., A Highly Efficient Olefin Metathesis Process for the Synthesis of Terminal Alkenes from Fatty Acid Esters. *Top. Catal.* 2012, 55, 518-523.
36. Zhang, J.; Song, S.; Wang, X.; Jiao, J.; Shi, M., Ruthenium-catalyzed olefin metathesis accelerated by the steric effect of the backbone substituent in cyclic (alkyl)(amino) carbenes. *Chem. Commun.* 2013, 49, 9491-9493.
37. Anderson, D. R.; Ung, T.; Mkrtumyan, G.; Bertrand, G.; Grubbs, R. H.; Schrodi, Y., Kinetic Selectivity of Olefin Metathesis Catalysts Bearing Cyclic (Alkyl)(Amino)Carbenes. *Organometallics* 2008, 27, 563-566.

38. Schrodi, Y.; Ung, T.; Vargas, A.; Mkrtumyan, G.; Lee, C. W.; Champagne, T. M.; Pederson, R. L.; Hong, S. H., Ruthenium Olefin Metathesis Catalysts for the Ethenolysis of Renewable Feedstocks. *Clean.* 2008, 36, 669-673.
39. Patel, J.; Mujcinovic, S.; Jackson, W. R.; Robinson, A. J.; Serelis, A. K.; Such, C., High conversion and productive catalyst turnovers in cross-metathesis reactions of natural oils with 2-butene. *Green Chem.* 2006, 8, 450-454.
40. Anderson, D. R.; Lavallo, V.; O'Leary, D. J.; Bertrand, G.; Grubbs, R. H., Synthesis and Reactivity of Olefin Metathesis Catalysts Bearing Cyclic (Alkyl)(Amino)Carbenes. *Angew. Chem.* 2007, 119, 7400-7403.
41. Kappe, C. O., Controlled Microwave Heating in Modern Organic Synthesis. *Angew. Chem. Int. Ed.* 2004, 43, 6250-6284.
42. Gawande, M. B.; Shelke, S. N.; Zboril, R.; Varma, R. S., Microwave-Assisted Chemistry: Synthetic Applications for Rapid Assembly of Nanomaterials and Organics. *Acc. Chem. Res.* 2014, 47, 1338-1348.
43. Polshettiwar, V.; Nadagouda, M. N.; Varma, R. S., Microwave-Assisted Chemistry: a Rapid and Sustainable Route to Synthesis of Organics and Nanomaterials. *Aust. J. Chem.* 2009, 62, 16-26.
44. Appukkuttan, P.; Dehaen, W.; Van der Eycken, E., Microwave-Enhanced Synthesis of N-Shifted Buflavine Analogues via a Suzuki-Ring-Closing Metathesis Protocol. *Org. Lett.* 2005, 7, 2723-2726.
45. Bargiggia, F. C.; Murray, W. V., Cross-Metathesis Assisted by Microwave Irradiation. *J. Org. Chem.* 2005, 70, 9636-9639.
46. Kappe, C. O.; Stadler, A.; Dallinger, D., Introduction: Microwave Synthesis in Perspective. In *Microwaves in Organic and Medicinal Chemistry*, Wiley-VCH Verlag GmbH & Co. KlGaA 2012; pp 1-7.
47. Dudley, G. B.; Richert, R.; Stiegman, A. E., On the existence of and mechanism for microwave-specific reaction rate enhancement. *Chem. Sci.* 2015, 6, 2144-2152.
48. Yang, C.; Murray, W. V.; Wilson, L. J., Microwave enabled external carboxymethyl substituents in the ring-closing metathesis. *Tetrahedron Lett.* 2003, 44, 1783-1786.
49. Morris, T.; Sandham, D.; Caddick, S., A microwave enhanced cross-metathesis approach to peptidomimetics. *Org. Biomol. Chem.* 2007, 5, 1025-1027.
50. Garbacia, S.; Desai, B.; Lavastre, O.; Kappe, C. O., Microwave-Assisted Ring-Closing Metathesis Revisited. On the Question of the Nonthermal Microwave Effect. *J. Org. Chem.* 2003, 68, 9136-9139.
51. Casey, C. P., 2005 Nobel Prize in Chemistry. Development of the Olefin Metathesis Method in Organic Synthesis. *J. Chem. Educ.* 2006, 83, 192.
52. Nguyen, S. T.; Grubbs, R. H.; Ziller, J. W., Syntheses and activities of new single-component, ruthenium-based olefin metathesis catalysts. *J. Am. Chem. Soc.* 1993, 115, 9858-9859.
53. Schwab, P.; Grubbs, R. H.; Ziller, J. W., Synthesis and Applications of RuCl2(CHR')(PR3)2: The Influence of the Alkylidene Moiety on Metathesis Activity. *J. Am. Chem. Soc.* 1996, 118, 100-110.
54. Trnka, T. M.; Grubbs, R. H., The Development of L2X2RuCHR Olefin Metathesis Catalysts: An Organometallic Success Story. *Acc. Chem. Res.* 2001, 34, 18-29.
55. Hong, S. H.; Wenzel, A. G.; Salguero, T. T.; Day, M. W.; Grubbs, R. H., Decomposition of Ruthenium Olefin Metathesis Catalysts. *J. Am. Chem. Soc.* 2007, 129, 7961-7968.
56. Ulman, M.; Grubbs, R. H., Ruthenium Carbene-Based Olefin Metathesis Initiators: Catalyst Decomposition and Longevity. *J. Org. Chem.* 1999, 64, 7202-7207.
57. Collins, S. K., Solvent and Additive Effects on Olefin Metathesis. In *Handbook of Metathesis*, Wiley-VCH Verlag GmbH & Co. KGaA 2015; pp 343-377.
58. Schrodi, Y., Mechanisms of Olefin Metathesis Catalyst Decomposition and Methods of Catalyst Reactivation. In *Handbook of Metathesis*, Wiley-VCH Verlag GmbH & Co. KGaA 2015; pp 323-342.
59. Patel, J.; Mujcinovic, S.; Jackson, W. R.; Robinson, A. J.; Serelis, A. K.; Such, C., High conversion and productive catalyst turnovers in cross-metathesis reactions of natural oils with 2-butene. *Green Chemistry* 2006, 8, 450-454.
60. Marx, V. M.; Sullivan, A. H.; Melaimi, M.; Virgil, S. C.; Keltz, B. K.; Weinberger, D. S.; Bertrand, G.; Grubbs, R. H., Cyclic Alkyl Amino Carbene (CAAC) Ruthenium Complexes as Remarkably Active Catalysts for Ethenolysis. *Angewandte Chemie International Edition* 2015, 54, 1919-1923.
61. Forman, G. S.; McConnell, A. E.; Hanton, M. J.; Slawin, A. M. Z.; Tooze, R. P.; van Rensburg, W. J.; Meyer, W. H.; Dwyer, C.; Kirk, M. M.; Serfontein, D. W., A Stable Ruthenium Catalyst for Productive Olefin Metathesis. *Organometallics* 2004, 23, 4824-4827.
62. Huber, G. W.; Iborra, S.; Corma, A., Synthesis of Transportation Fuels from Biomass: Chemistry, Catalysts, and Engineering. *Chemical Reviews* 2006, 106, 4044-4098.
63. Marinescu, S. C.; Schrock, R. R.; Miller, P.; Hoveyda, A. H., Ethenolysis Reactions Catalyzed by Imido Alkylidene Monoaryloxide Monopyrrolide (MAP) Complexes of Molybdenum. *Journal of the American Chemical Society* 2009, 131, 10840-10841.
64. Schrodi, Y.; Ung, T.; Vargas, A.; Mkrtumyan, G.; Lee, C. W.; Champagne, T. M.; Pederson, R. L.; Hong, S. H., Ruthenium Olefin Metathesis Catalysts for the Ethenolysis of Renewable Feedstocks. *CLEAN—Soil, Air, Water* 2008, 36, 669-673.
65. Arshad, M.; Saied, S.; Ullah, A., PEG-lipid telechelics incorporating fatty acids from canola oil: synthesis, characterization and solution self-assembly. *RSC Advances* 2014, 4, 26439-26446.

What is claimed is:

1. A method of conversion of a lipid to an olefin product, comprising the steps of heating a mixture of unsaturated triacylglycerols or alkyl esters of unsaturated fatty acids and a reactant olefin with microwave irradiation, in the presence of a ruthenium complex catalyst in reaction conditions sufficient to convert the mixture into an effluent comprising the olefin product.

2. The method of claim 1 wherein the unsaturated triacylglycerols comprises a vegetable oil, waste cooking oil, or wherein the alkyl esters of unsaturated fatty acids comprise methyl esters of fatty acids derived from a vegetable oil or waste cooking oil.

3. The method of claim 1 wherein the reactant olefin comprise ethylene or 1,5-hexadiene.

4. The method of claim 1 wherein the ruthenium complex catalyst comprises one of Grubb's 1st generation or 2nd generation catalyst or Hoveyda-Grubb's 1st generation or 2nd generation catalyst.

5. The method of claim 1 wherein the mixture is heated to a temperature between about 30° C. and 80° C.

6. The method of claim 5 wherein the reaction temperature is 50° C.

7. The method of claim 1 wherein the mixture does not include a solvent.

8. The method of claim 4 wherein the catalyst is present in a concentration between about 0.005 mole % and 0.5 mole %.

9. The method of claim 8 wherein the catalyst is HG2.

10. The method of claim 5 wherein the reaction time is between about 3 minutes to about 10 minutes, including ramping time and hold time.

11. The method of claim 1 wherein the unsaturated triacylglycerols are derived from spent hen.

12. The method of claim 11 wherein the unsaturated triacylglycerols are extracted from spent hen using a solvent heated by microwave irradiation.

* * * * *